United States Patent
Wheatley, Jr.

[11] 3,720,225
[45] March 13, 1973

[54] FULL OPENING WAFER VALVE

[76] Inventor: Thomas Wheatley, Jr., 3717 Pinemont, Houston, Tex. 77018

[22] Filed: March 8, 1971

[21] Appl. No.: 121,877

Related U.S. Application Data

[63] Continuation-in-part of Ser. No. 23,818, March 30, 1970, abandoned.

[52] U.S. Cl..................................137/268, 137/527.8
[51] Int. Cl................................................F16k 15/03
[58] Field of Search.....137/268, 544, 527, 527.8, 454.2; 15/104.06 A; 251/298

[56] References Cited

UNITED STATES PATENTS

| | | | |
|---|---|---|---|
| 2,882,923 | 4/1959 | Smolensky | 137/527.8 X |
| 3,166,094 | 1/1965 | Eagleton | 137/544 |
| 3,191,619 | 6/1965 | Allen | 137/527 X |
| 3,275,028 | 9/1966 | Reppert et al. | 137/527.8 X |
| 3,565,107 | 2/1971 | Bunch | 137/527.8 X |

Primary Examiner—Henry T. Klinksiek
Assistant Examiner—Robert J. Miller
Attorney—Charles E. Lightfoot

[57] ABSTRACT

A full opening valve of the swinging disk type having a valve housing or casing formed with an internal recess into which the disk is movable when the valve is opened to provide full opening of the flowway, the valve housing having internal means providing a guiding surface for balls, pipeline pigs, or the like, to eliminate internal projections in the flowway and to allow such objects to pass freely through the valve without becoming stuck in the valve. The valve is constructed with support means for the disk which takes the form of a ring or wafer, and the valve housing is formed in two parts adapted to be releasably secured together and between which the wafer is removably disposed, the disk being pivotally mounted on the wafer for removal therewith. Means is also provided for operating the valve manually from the exterior of the housing.

6 Claims, 5 Drawing Figures

PATENTED MAR 13 1973 3,720,225

Thomas Wheatley, Jr.
INVENTOR

BY
Charles E. Lightfoot
ATTORNEY

Thomas Wheatley, Jr.
INVENTOR

BY
Charles E. Lightfoot
ATTORNEY

FULL OPENING WAFER VALVE

RELATED APPLICATIONS

This application is a continuation-in-part of application Ser. No. 23,818, filed Mar. 30, 1970, now abandoned, by the same inventor, and bearing the same title.

BACKGROUND OF THE INVENTION

In the operation of pipelines, it has become customary to introduce into such lines balls or pigs which are closely fitted to the pipe for sealing engagement therewith to allow such objects to be passed through the line by a pressure gradient therein. Due to the manner in which pipelines are usually constructed, such pipeline devices frequently become stuck in the line at locations where there is a constriction or internal projection, or in valves which do not provide for full opening of the flowway.

Sticking of pipeline pigs, balls, or the like, in pipelines is particularly likely to occur where valves of the swinging disk are employed, such valves being usually constructed for partial opening only, so that the balls or pigs must be forced through a portion of the flowway which is of reduced size, resulting in obstruction of the line or damage to the pigs or balls.

The provision of a flowway portion of increased size to allow full opening of the disk in valves of this kind presents the disadvantage that by-passing of fluid in the flowway at such a location may take place, causing the pig or ball to become lodged in the line, or that the pig or ball may become caught on some internal projection formed by such an enlarged portion of the flowway.

Valves of the swinging disk type, adapted for use as check valves, are not ordinarily provided with means operable manually from the exterior of the housing for opening and closing the valve, but are usually adapted only for automatic operation by the flow of fluid in the flowway to open the valve upon the flow of fluid in one direction and to close the same upon the flow of fluid in the other direction. Moreover, such valves are not commonly constructed to permit the removal of the valve disk and its support from the housing without also removing the housing from the flow line for the purpose of replacement of the valve and valve seat, should such replacement be necessary.

SUMMARY OF THE INVENTION

Briefly described, the valve of the invention comprises a hollow valve body or casing in which a valve member of the disk type is hingedly supported for swinging movement into and out of a position to close the flowway, the body being formed with an internal recess into which the valve may move upon opening movement of the valve, to allow the valve to move to a position entirely out of the flowway to fully open the flowway.

The valve body also has means extending longitudinally across the valve receiving recess providing an inside surface extending longitudinally downstream from the valve seat and which is shaped for coaction with the valve body and disk when the valve is open to form a guiding surface positioned to be sealingly engaged by a pipeline pig or the like passing through the valve to substantially close the flowway against the flow of fluid past the same during such passage of the pig through the valve.

The valve disk is pivotally supported on an annular wafer or ring for vertical swinging movement into and out of closing engagement with an annular valve seat formed on the wafer, and the valve housing is formed in two parts adapted to be releasably secured together with the wafer positioned between adjacent end faces of the two parts of the housing, to permit the parts to be disconnected to allow the wafer and the disk therewith to be removed from the assembly without removing the parts of the housing from the flow line.

The parts of the housing may conveniently be of well known construction, such as standard pipe fittings formed with external end flanges having planar end faces. The wafer or ring is provided with planar end faces for sealing engagement with the adjacent end faces of the flanges of the housing parts when the wafer is in position between the parts, and the wafer is of sufficient thickness to allow the valve to be entirely within the end faces of the wafer when the valve is closed, so that the wafer may be easily removed from between the housing parts with the valve attached thereto without removing the housing from the line when replacement of the valve or its seat is necessary.

The valve disk is pivotally secured to the wafer by a hinge pin which is removable from the exterior of the housing to enable the disk to be disconnected from the wafer to allow the wafer to be removed in the event that the valve disk should become stuck in an open or partly open position, or because of other damage to the structure making such disconnection necessary. Means may also be provided on the hinge pin, which may be keyed or otherwise connected to the disk for rotation in response to swinging movement of the disk, whereby the valve may be operated from the exterior of the housing if desired.

DETAILED DESCRIPTION OF PARTICULAR EMBODIMENTS OF THE INVENTION

Figure 1:
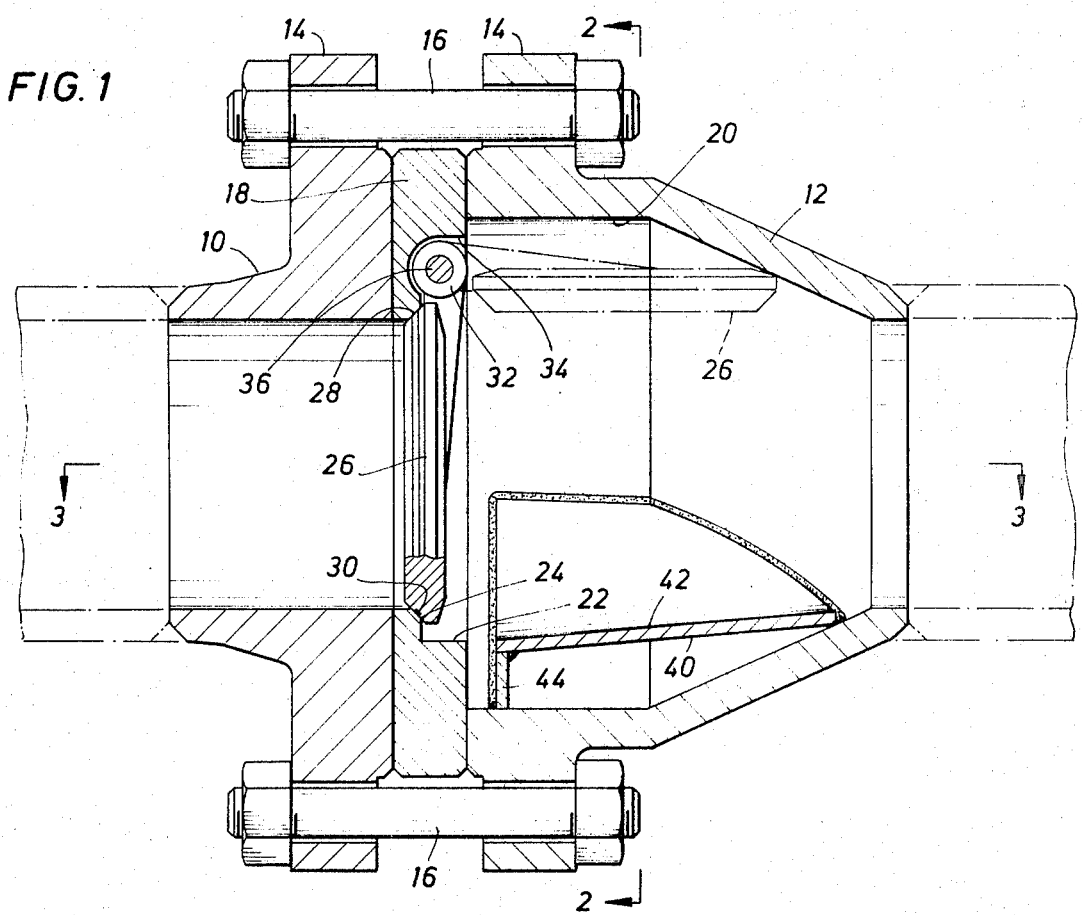
FIG. 1 is a vertical, central, longitudinal, cross sectional view of a preferred embodiment of the valve of the invention.
Figure 2:
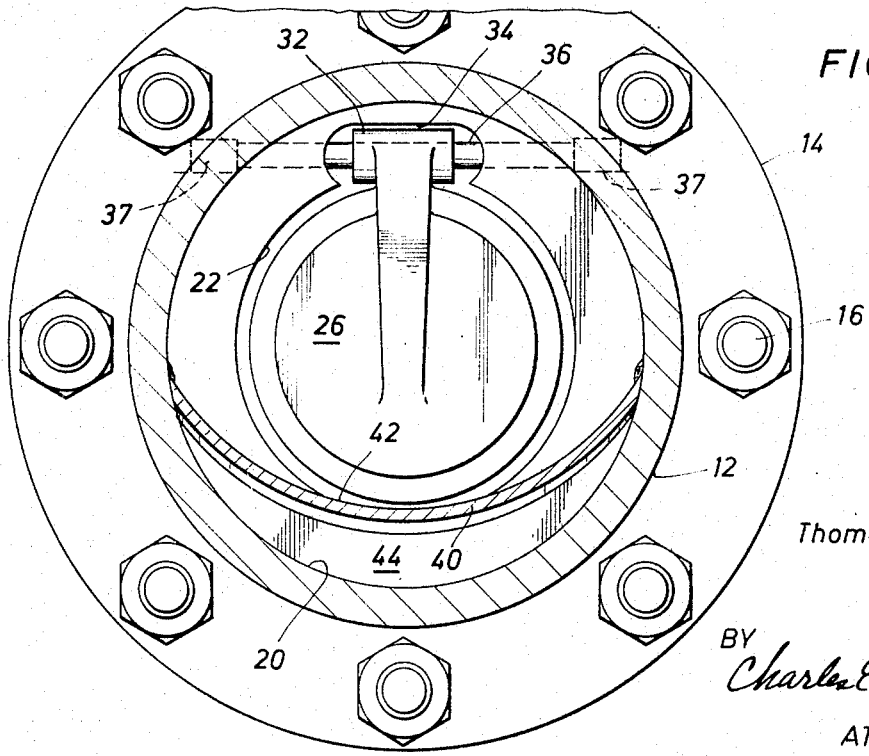
FIG. 2 is a cross sectional view taken along the line 2 — 2 of FIG. 1, looking in the direction indicated by the arrows.
Figure 3:
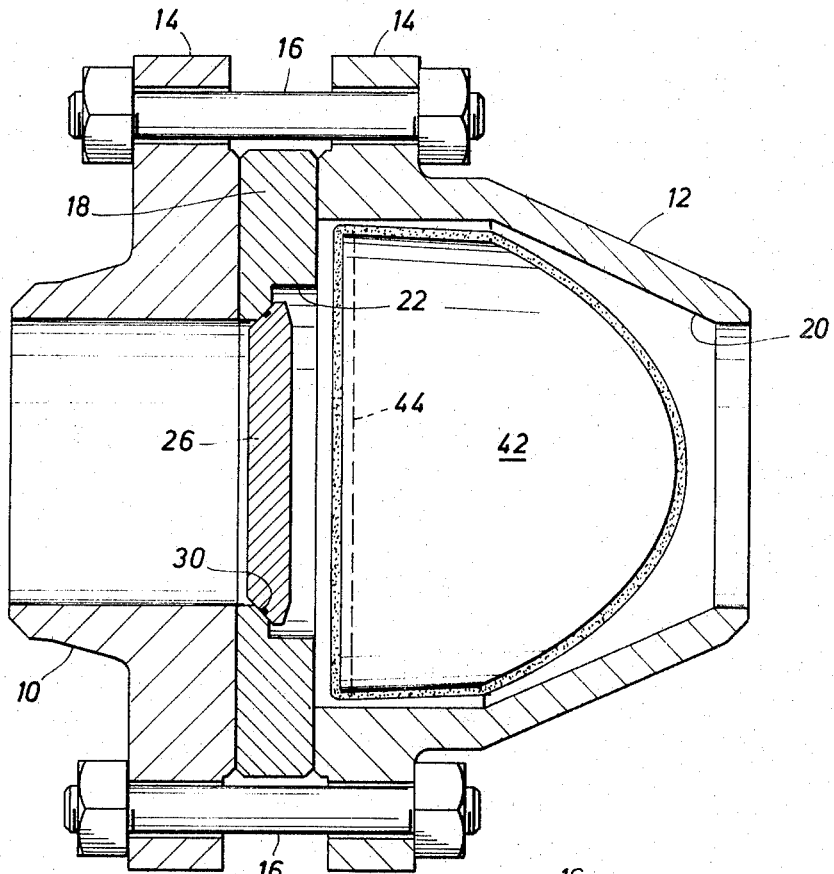
FIG. 3 is a cross sectional view taken along the line 3 — 3 of FIG. 1, looking in the direction indicated by the arrows.

The invention is illustrated herein in connection with its use in a pipeline through which it may be desired to pass a resilient ball or pipeline pig, which may be of generally cylindrical shape, which is more or less tightly fitted into the line into sealing contact with the internal surface of the pipe to allow the object to be moved along the line by a pressure gradient therein. Such devices are often used in pipelines for the purpose of cleaning the line, or at times to separate fluids of different character which are to be pumped through the line.

In the event that there are valves, such as hinged disk valves, in such a pipeline which do not open fully, such valves present a restriction in the line through which the pig or ball must pass, which may result in damage or destruction of the pig or ball, or which may cause the same to become stuck in the line. It is for the purpose of providing a disk valve in which the valve disk may move to position entirely out of the flowway to open the flowway fully to allow the free passage therethrough of the pig or ball, thus maintaining the flowway substantially closed against the flow of fluid past the same, that the present invention is designed.

The valve of the invention comprises a hollow valve body or casing, including two parts, 10 and 12 adapted to be connected into a pipeline, as by means of welding or otherwise, and each having an external annular flange 14 provided with peripherally spaced openings through which bolts 16 may be extended to connect the parts together with an annular valve supporting member 18 positioned between the flanges.

The parts 10 and 12 each have an internal diameter of their outer ends which is the same as the internal diameter of the pipeline into which the valve is connected, and the part 10 is of the same internal diameter throughout its length, while the part 12 has an internal enlargement 20 whose diameter is substantially larger than the diameter of the flowway at the inner end of the part 12, and which has a tapering portion extending downstream from the inner end thereof to merge with the line.

The parts 10 and 12 may conveniently be standard pipe fittings of a king commonly used in pipeline construction, whereby the valve housing may be easily and economically produced without special parts or costly machining operations.

The annular valve supporting member or ring 18 may take the form of an annular wafer with flat faces positioned for engagement with the outer faces of the flanges 14 when the valve is assembled, and suitable seal forming means of a well known type may be positioned between the member and flanges to form a fluid tight seal therebetween. The ring 18 is formed with an annular recess 22 in its downstream side, whose bottom wall is formed with a bevelled face 24 forming an annular valve seat.

The valve includes a valve disk 26 which is shaped to extend into the recess 22 of the ring 18, and which is formed on its upstream side with an annular, bevelled seating face 28 which seats on the seat 24 of the ring when the valve is closed. Suitable seal forming means of a usual type, such as that shown at 30, may be carried by the disk 26 in a groove provided for the same in the seating face 28 for sealing engagement with the seat 24 when the valve is closed.

The disk 26 is also formed with a perforated hinge lug 32 which extends into an extension 34 of the recess 22 of the ring 18 and through which a pivot pin 36 is extended by which the disk is hingedly supported on the ring for swinging movement into and out of a position to close the valve seat. The pin 36 may be extended at its opposite ends into openings 37 in the ring which may extend through the ring through the external peripheral face thereof, so that the pin may be readily driven out of the ring to release the disk therefrom.

It will be readily apparent that the valve disk may move into the enlargement 20 when the valve moves to fully open position with the disk positioned entirely out of the flowway to fully open the flowway.

When the valve is closed, the downstream face of the disk 26 as well as the hinge lug 32 lie entirely within the downstream face of the ring 18.

The valve body or casing is provided with an internal curved guide place 40 which extends downstream from the ring 18 and whose sides taper longitudinally inwardly and converge downstream to merge with the flowway at the outer end portion of the part 12 to close a portion of the recess 20, and to provide an internal curved surface 42 which merges along the sides of the plate with the surrounding internal surface of the part 12. This guide plate forms with the internal surface of the part 12 a portion of the flowway through which an object, such as a ball or pipeline pig, may pass, and which is shaped for engagement therewith to close the flowway against the flow of fluid past the ball or pig during such passage.

The plate 40 may be attached to the part 12 by welding along the side of the plate and may be connected to the part at its inner edge by a laterally extending plate 44, as shown in FIG. 1.

By thus closing a portion of the enlargement 20 of the part 12, the portion of the flowway which extends through the part 12 may be formed of a size and shape to be sealingly engaged with a resilient ball or pipeline pig as the same moves through the valve to maintain the flowway closed by the pig or ball during such passage and to eliminate internal projections or restrictions in the flowway likely to cause sticking of the pig or ball, or damaging the same.

It will also be seen that the upstream face of the disk when the valve is fully open forms a portion of the internal surface of the flowway against which the pig or ball is engaged during the passage of the same through the valve.

The part 12 may, of course, be formed as a casting having an internal, integral portion formed with a curved surface which takes the place of the surface 42 of the plate 40.

For the purposes of maintenance and repair, the ring 18 with the disk 26 attached thereto may be readily removed by taking out the bolts 16 to allow the ring to be bodily removed from between the flanges 14, whereupon the disk may be released from the ring, if desired, by driving out the pin 36.

Figure 4:
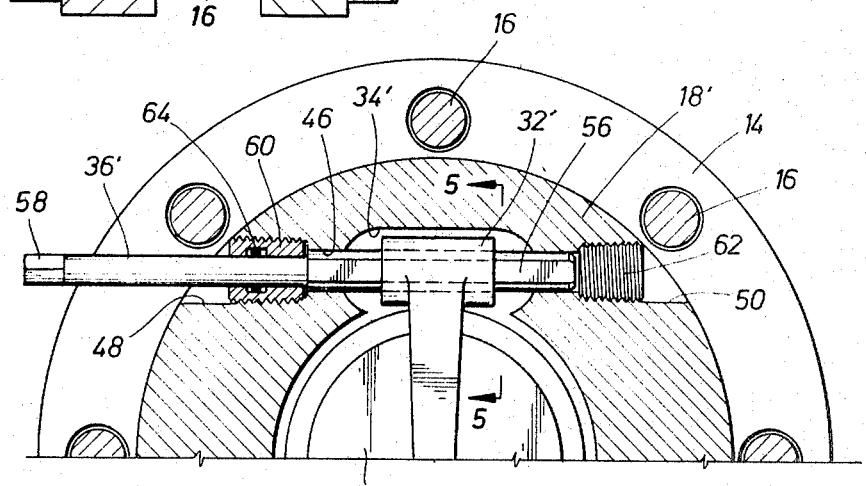
FIG. 4 is a fragmentary, vertical, cross sectional view, taken at the location of the hinge pin, illustrating a modified form of the invention; and, FIG. 5 is a fragmentary cross sectional view, on a somewhat enlarged scale, taken along the line 5 — 5 of FIG. 4, looking in the direction of the arrows.
Figure 5:
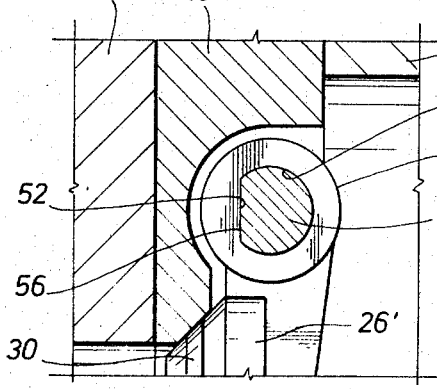

A somewhat modified form of the invention is illustrated in FIGS. 4 and 5, wherein the wafer 18' is formed with a hinge pin bore or opening 46 which includes the extension portion 34' of the recess 22 of the ring and which has enlarged counterbore portions 48 and 50 at its opposite ends which are internally threaded. The disk 26' has a perforated hinge lug 32' formed with an internal flat face 52 extending from end to end of the bore 54 of the lug and which lug is disposed in the recess portion 34' with its bore 54 in longitudinal alignment with the hinge pin bore 46 of the wafer. A hinge pin or operating shaft 36' is extended into the bore 46 and through the bore 54 of the lug 32' and is formed with a flat external face 56 in engagement with the flat face 52 of the bore 54 to cause the disk to swing vertically in response to rotational movement of the pin.

The pin 36' extends at one end outwardly beyond the circumference of the wafer 18' and the valve housing and is provided at its outer extremity with an end portion 58 shaped to fit a handle or wrench by which the pin may be rotated from the exterior of the housing to open or close the valve. The pin 36' may be rotatably extended through a bearing 60 threadedly inserted in the counterbore 48, and the counterbore 50 may be closed by a screw plug 62.

By this arrangement, the disk 26' may be rotated to open or closed position by operation of the hinge pin or shaft 36' from the exterior of the housing, and in the event that it should be desired to disconnect the disk from the wafer, either before or after the removal of the wafer and disk from the valve assembly, the pin 36' may be driven out by removing the bearing 60 and plug 62.

The bearing 60 may, of course, be provided with a suitable seal, such as the O-ring 64 located in a groove provided for the same, surrounding the pin.

The pin or shaft 36' may be releasably secured to the lug 32' by other suitable means, if desired, such as by the use of a key or the like.

It will thus be seen that the invention, constructed as herein described, provides a valve of the removable, wafer supported, hinged disk type in which the valve is movable to a position out of the flowway to fully open the flowway when the valve is open, and wherein the internal surface of the flowway through the valve is shaped for engagement with a pig or ball which is sealingly engagable with the flowway beyond the valve to close the flowway against the flow of fluid past the pig or ball during passage of the same through the valve.

Having thus clearly shown and described the invention, what is claimed as new and desired to secure by Letters Patent is:

1. A valve of the hinged disc type, comprising:
   a hollow valve body formed of two separable parts, each adapted to be connected to the ends of two pipe sections to define a flow way therethrough;
   opposed end faces on said two parts adapted to be positioned approximately parallel to one another;
   a generally planar support member adapted to be positioned between said opposed end faces, said support member having a central opening perpendicularly therethrough and comprising a portion of the flow way through said body on being assembled therewith, and further including a valve seat substantially surrounding said opening, and further having a predetermined thickness between a pair of faces;
   means for clamping said support member between said end faces in controlled sealing engagement;
   a valve disc hingedly supported by said support member for swinging movement into and out of closing relation to said valve seat, said disc having a closing relation to said support member being fully within the faces of said support member;
   a passage means in said support member perpendicular to said central opening;
   a hinge pin in said passage means;
   connective means extending from said valve disc to said hinge pen to support said valve disc on swinging movement about said hinge pin; and,
   an elongate operator arm adapted to be connected to said hinge pin at one end thereof and having a length sufficient to extend to a point beyond said support member sufficient to permit external manipulation thereof for the opening and closing of valve disc.

2. The valve of claim 1 including a recessed groove means in said support member extending along a non-radial line thereof, and a shaft connected to said disc and adapted to be received within said groove means for hingedly swinging said valve disc.

3. The structure of claim 1 wherein said operator arm is received in a second passage means in said support member.

4. The structure of claim 3 wherein said second passage means is parallel to and terminates at one end of said first passage means and including a seal means therein preventing fluid communication along said second passage means.

5. The structure of claim 4 further including a threaded releasably engagable means for removing at least the portion of said arm extending beyond said support member.

6. The structure of claim 4 wherein said first passage means has the form of a recess across one face of said support member and further including means for releasably securing said hinge pin therein on assembly of said disc to said support member.

* * * * *